(12) United States Patent
Hongbing et al.

(10) Patent No.: US 12,463,289 B2
(45) Date of Patent: Nov. 4, 2025

(54) METHOD FOR PREPARING DIAPHRAGM OF LITHIUM-ION BATTERY INCLUDING THREE LAYER CO-EXTRUSION FOLLOWED BY TREATMENT IN ANNEALING BOX

(71) Applicant: Wuhan Huiqiang New Energy Material Technology Co. Ltd, Wuhan (CN)

(72) Inventors: Wang Hongbing, Wuhan (CN); Tang Haolin, Wuhan (CN); Bian Hongbing, Wuhan (CN)

(73) Assignee: Wuhan Huiqiang New Energy Material Technology Co. Ltd., Wuhan (CN)

( * ) Notice: Subject to any disclaimer, the term of this patent is extended or adjusted under 35 U.S.C. 154(b) by 580 days.

(21) Appl. No.: 17/908,523

(22) PCT Filed: Feb. 10, 2021

(86) PCT No.: PCT/CN2021/076429
§ 371 (c)(1),
(2) Date: Aug. 31, 2022

(87) PCT Pub. No.: WO2021/175111
PCT Pub. Date: Sep. 10, 2021

(65) Prior Publication Data
US 2023/0170578 A1 Jun. 1, 2023

(30) Foreign Application Priority Data
Mar. 3, 2020 (CN) .......................... 202010140837.1

(51) Int. Cl.
*H01M 50/403* (2021.01)
*B29C 48/00* (2019.01)
(Continued)

(52) U.S. Cl.
CPC ....... *H01M 50/403* (2021.01); *B29C 48/0017* (2019.02); *B29C 48/0018* (2019.02);
(Continued)

(58) Field of Classification Search
CPC ............. H01M 50/403; H01M 50/417; H01M 50/457; H01M 10/0525; B29C 48/146; B29C 48/18; B29C 48/0018
(Continued)

(56) References Cited

U.S. PATENT DOCUMENTS

2022/0311097 A1\* 9/2022 Yen ..................... H01M 50/489

FOREIGN PATENT DOCUMENTS

CN 107331822 A 11/2017
CN 207416022 U 5/2018
(Continued)

OTHER PUBLICATIONS

WO2021175111A1 Patent with International Search Report in English and Chinese, Sep. 10, 2021.

*Primary Examiner* — Sean P Cullen
(74) *Attorney, Agent, or Firm* — Jenei LLC

(57) ABSTRACT

Disclosed is a method for preparing a three-layer-co-extruded diaphragm of a lithium-ion battery, falling into lithium-ion battery diaphragm technical field. The annealing box used comprises: box body, motor and sealing over, with uniformly-arranged heating plates fixedly connected to inner surface of the box body, a driving shaft arranged horizontally within the box body in front-back direction, a first and second driven shafts arranged on the left and right sides of the driving shaft correspondingly within the box body, an interlayer film coiling connected between the driving shaft and the first driven shaft within the box body horizontally; a diaphragm coiling connected between the driving shaft and the second driven shaft within the box body slantwise.

(Continued)

Controllable annealing temperature and insulation from external environment avoid influence of external environment on diaphragm and ensure uniform heating of diaphragm. It produces a diaphragm of stable quality and is convenient to be mass-produced.

8 Claims, 7 Drawing Sheets

(51) Int. Cl.
| | | |
|---|---|---|
| *B29C 48/14* | (2019.01) | |
| *B29C 48/18* | (2019.01) | |
| *B29K 23/00* | (2006.01) | |
| *H01M 10/0525* | (2010.01) | |
| *H01M 50/417* | (2021.01) | |
| *H01M 50/457* | (2021.01) | |

(52) U.S. Cl.
CPC ............ *B29C 48/146* (2019.02); *B29C 48/18* (2019.02); *H01M 10/0525* (2013.01); *H01M 50/417* (2021.01); *H01M 50/457* (2021.01); *B29C 2948/92209* (2019.02); *B29C 2948/9238* (2019.02); *B29K 2023/12* (2013.01)

(58) Field of Classification Search
USPC ......................................... 429/144, 251, 254
See application file for complete search history.

(56) References Cited

FOREIGN PATENT DOCUMENTS

| | | |
|---|---|---|
| CN | 111319216 A | 6/2020 |
| JP | 2010228126 A | 10/2010 |
| KR | 20140123316 A | 10/2014 |

* cited by examiner

S1: firstly, adding two different types of polypropylene resins into inlets of two different extruders respectively for melting and plasticizing at the conveying-section temperature of 60-70°C, the compression-section temperature of 150-200°C, the metering-section temperature of 200-230°C, and the rotating speed of 100-250rpm;

↓

S2: synchronously co-extruding the two different polypropylene resins obtained after melting and plasticizing in the step S1 from a three-layer composite casting die head of a three-layer co-extrusion casting machine, and drawing the co-extruded resins to form a film at a high draw ratio, so as to obtain a casting film with an A/B/A three-layer co-extrusion structure;

↓

S3: placing the casting film with the A/B/A three-layer co-extrusion structure in an annealing box to be subjected to annealing at the annealing temperature of 130-150°C for 1-24h;

↓

S4: carrying out longitudinal cold and hot stretching on the annealed casting film to form a porous film structure, preparing the diaphragm with a microporous structure and the A/B/A three-layer co-extrusion structure, and finally, thermoforming the obtained porous diaphragm and then cooling the diaphragm to

Fig. 1

METHOD FOR PREPARING DIAPHRAGM OF LITHIUM-ION BATTERY INCLUDING THREE LAYER CO-EXTRUSION FOLLOWED BY TREATMENT IN ANNEALING BOX

TECHNICAL FIELD

The present disclosure belongs to the technical field of lithium-ion battery diaphragms and specifically relates to a method for preparing a diaphragm of a lithium-ion battery by three layer co-extrusion.

BACKGROUND ART

A diaphragm can be used for separating a positive electrode from a negative electrode, isolating electron conduction and providing a channel for lithium ion transmission in a lithium ion battery, and serves as a key material in deciding the interface structure, the internal resistance, the capacity, the cycle performance, and especially the safety performance of the lithium battery. Under an over-charge/over-discharge or other extreme conditions, the internal temperature of the lithium battery rises sharply, and when the internal temperature of the battery approaches the melting point of a diaphragm pore-forming material, the pore-forming material can be softened and pores are closed, and further ion transmission is blocked, an open circuit is formed and the safety is protected. However, the diaphragm is extremely likely to breaking if no timely response is made during sharp temperature rise while pore closing due to the fact that the hole closing temperature and the melting temperature of the diaphragm made of a single-layer material are the same. Furthermore, short circuit or even explosion occurs due to direct contact between the positive and negative electrodes of the battery.

SUMMARY

Technical Problem

Meanwhile, in the prior art, a roll core of a diaphragm of a roll-shaped structure tends to non-uniform heating and cooling during annealing, the quality of the diaphragm is reduced or even the diaphragm is unqualified, purely cooling at the room temperature cannot meet the processing requirement for accurate temperature change within a period in the annealing process, great temperature change occurs in diaphragm processing in summer or winter, and external environment change greatly influences diaphragm production.

Therefore, a method for preparing the diaphragm of the lithium-ion battery by three layer co-extrusion, in which a special annealing box is adopted, is developed to solve the above problems.

Solution to Problem

Technical Solution

For overcoming the defects in the prior art, i.e., a roll core of a diaphragm of a roll-shaped structure tends to non-uniform heating and cooling during annealing, the quality of the diaphragm is reduced or even the diaphragm is unqualified, purely cooling at the room temperature cannot meet the processing requirement for accurate temperature change within a period in the annealing process, great temperature change occurs in diaphragm processing in summer or winter, and external environment change greatly influences diaphragm production, it is therefore an object of the present disclosure to provide a method for preparing a diaphragm of a lithium-ion battery by three layer co-extrusion to solve the problems in the prior art.

According to adopted technical schemes, the method for preparing the diaphragm of the lithium-ion battery by three layer co-extrusion comprises the following steps:

S1, firstly, adding two different types of polypropylene resins into inlets of two different extruders respectively for melting and plasticizing at the conveying-section temperature of 60-70° C., the compression-section temperature of 150-200° C., the metering-section temperature of 200-230° C., and the rotating speed of 100-250 rpm;

S2, synchronously co-extruding the two different polypropylene resins obtained after melting and plasticizing in the step S1 from a three-layer composite casting die head of a three-layer co-extrusion casting machine, and drawing the co-extruded resins to form a film at a high draw ratio, so as to obtain a casting film with an A/B/A three-layer co-extrusion structure;

S3, placing the casting film with the A/B/A three-layer co-extrusion structure in an annealing box to be subjected to annealing at the annealing temperature of 130-150° C. for 1-24 h;

and S4, carrying out longitudinal cold and hot stretching on the annealed casting film to form a porous film structure, preparing the diaphragm with a microporous structure and the A/B/A three-layer co-extrusion structure, and finally, thermoforming the obtained porous diaphragm and then cooling the diaphragm to room temperature;

wherein, the annealing box in S3 comprises a box body, a motor and a sealing cover; the box body is of a cuboid structure; a cavity is formed in the box body; the inner surface of the box body is fixedly connected with heating plates which are uniformly arranged; a driving shaft is horizontally arranged in the box body in the front-back direction; a first driven shaft is arranged in the left side of the driving shaft in the box body; a second driven shaft is arranged in the right side of the driving shaft in the box body; the driving shaft, the first driven shaft and the second driven shaft are rotationally connected with the box body through bearings, and the front end surfaces of the first driven shaft and the second driven shaft penetrate through the box body and extend out of the box body; the front end surface of the box body is fixedly connected with a power box cover; the front end surface of the power box cover is fixedly connected with the motor; an output shaft of the motor penetrates through the power box cover, extends into the power box cover, and is fixedly connected with the front end surface of the driving shaft; a driving gear is fixedly connected to the position, close to the flange face of the motor, of the outer arc face of the output shaft of the motor; the outer arc surface of the second driven shaft is fixedly connected with a driven gear in front of the box body, and the driving gear is engaged with the driven gear; a driving rotary disc is fixedly connected to the position, close to the front end face of the box body, of the outer arc face of the output shaft of the motor; a driven rotary disc is fixedly connected to the position, close to the front end face of the first driven gear, of the outer arc face of the first driven shaft; a driving belt is connected between the driving rotary disc and the driven rotary disc; an interlayer film is in coiled connection to the position, in the box body, between the driving shaft and the first driven shaft in a horizontal manner; a diaphragm is in coiled connection between the driving shaft and the second driven shaft in the box body in an oblique manner; an opening is formed in the right upper edge of the box body; a sealing door is arranged at the opening of the box body; and a control box is fixedly connected to the position, close to the front end face of the box body, of the left side face of the box body. When the diaphragm is annealed during work, the diaphragm tends to be a roll-shaped structure to save space, however, the roll-shaped structure tends to causing non-uniform heating and cooling of the diaphragm, the quality of the diaphragm is reduced or even the diaphragm is unqualified, purely cooling at the room temperature cannot meet the processing requirement for accurate temperature change within a period in the annealing process, great temperature change occurs in diaphragm processing in summer or winter, and external environment change greatly influences diaphragm production. The annealing box is thus adopted to reduce influence of environment change on diaphragm product and ensure the stability of the diaphragm quality. Concretely, the sealing door is opened, the diaphragm is coiled on the second driven shaft, the end of the diaphragm is connected onto the driving shaft, and cooperated with the wound interlayer film to realize synchronous coiling on the driving shaft; then, the sealing door is closed, a power supply is switched on to heat the heating plates, and the temperature in the box body is increased; the motor is started, and the output shaft of the motor rotates, so that on one hand, the driving shaft is driven to rotate, and on the other hand, the driving rotary disc drives the driving belt to move, further, the driven rotary disc is driven to rotate, and the first driven shaft rotates in the same direction; meanwhile, the output shaft of the motor rotates to drive the driving gear to rotate, the driving gear drives the driven gear to rotate, and the driven gear drives the second drive shaft to rotate in the reverse direction; the diaphragm and the interlayer film are wound and separated synchronously; due to the fact that the heat conductivity of the interlayer film is higher than that of the diaphragm, it is ensured that the diaphragm is uniformly heated; and further, by means of forward and backward rotation of the motor, coiling between the driving shaft and the second driven shaft is realized, and rapid heating and uniform cooling of the diaphragm is ensured. According to the method for preparing the diaphragm of the lithium-ion battery by three layer co-extrusion and the annealing box used therein, the problems in the prior art are overcome, the annealing temperature is controllable, external environment is isolated, influence of the external environment on the diaphragm is avoided, heating uniformity of the diaphragm is guaranteed, the produced diaphragm is stable in quality, and large-scale rapid production of the diaphragm is facilitated.

Preferably, collars are rotationally connected to the outer arc surfaces of the first driven shaft and the second driven shaft; the diaphragm and the interlayer film are both wound on the outer arc surfaces of the corresponding collars; stepped grooves are formed in the positions, corresponding to the collars, of the outer arc surfaces of the first driven shaft and the second driven shaft; an adjusting groove is formed in the groove bottom of each stepped groove; an adjusting plate is arranged in each adjusting groove; and the side face of the side, opposite to the corresponding collar, of each adjusting plate is of a rough surface structure. When the first driven shaft and the second driven shaft rotate during work, the interlayer film and the diaphragm are coiled, or the interlayer film and the diaphragm wound on the surfaces of the driven shafts are coiled to the surface of the driving shaft, so that the diaphragm is coiled alternatively between the driving shaft and the second driven shaft. However, during annealing, the diaphragm is softened or contracted to certain extent due to high temperature in the box body, so that longitudinal cold and hot stretching of the casting film is needed subsequently. The collars and the adjusting plates are arranged to reduce influence of the annealing coiling process on the natural size of the diaphragm or overcome the problem of tensile stress increase between the driving shaft and the second driven shaft when the diaphragm is heated and contracted; when the diaphragm is coiled on the surfaces of collars and the diaphragm is contracted to generate a tangential tensile force on the collars, the adjusting plates are arranged between the second driven shaft and the collars, and the side face of the side, opposite to the corresponding collar, of each adjusting plate is of the rough surface structure; and when the tangential tensile force generated by contraction of the diaphragm is greater than a friction force between the adjusting plate and the corresponding collar, the collar rotates relative to the first or second driven shaft, the tangential tensile stress generated by contraction of the diaphragm is released, and the phenomenon that a too large contraction stress influences the diaphragm quality is avoided.

Preferably, the adjusting plates are connected with the corresponding adjusting grooves in a hinged mode; springs are connected between each adjusting plate and the side faces of the two sides of the corresponding adjusting groove; a strip-shaped groove is formed at the position, of the adjusting plate, in the inner arc face of the collar, and the adjusting plate is in contact connection with the strip-shaped groove; the small diameter of the collar is greater than the outer diameter of the first driven shaft and the outer diameter of the second driven shaft; guide grooves are formed in the positions, close to the two end faces of the corresponding collars, of the first driven shaft and the second driven shaft respectively; the position, corresponding to the guide groove, of each collars is of a guide convex face structure; rolling grooves which are uniformly distributed are formed in the arc surfaces of the sides, opposite to the corresponding guide grooves, of the first driven shaft and the second driven shaft; and balls are connected into the rolling grooves in a rolling mode, and are connected with the groove bottoms of the corresponding guide grooves in a rolling mode. During work, the contraction stress of the diaphragm is automatically released and adjusted by means of the friction force between the adjusting plates and the collars. On one hand, the collars and the rough surfaces of the adjusting plates are worn much during long-term use, the friction coefficient is changed, relative rotation between the collars and the first or second driven shaft tends to occur in the normal coiling process of the diaphragm and the interlayer film, and normal use of the annealing box is influenced. On the other hand, the collars make direct contact with the first or second driven shaft, a relatively large contact surface generates a relatively large friction force, and normal adjustment of the adjusting plates is greatly influenced. Therefore, the springs and the balls are arranged; the adjusting plates are hinged and the springs provide a pulling force, the adjusting plate is positioned in one corresponding strip-shaped groove generally; when the tangential pull force of the diaphragm or the interlayer film on the collars is relatively large, the adjusting plates are rotated and the springs are deformed; further the adjusting plate is moved to the adjacent strip-shaped groove when rotated too much; thus, relative rotational adjustment between the collars and the first or second driven shaft is realized; and the guide grooves are arranged, the collars are rotationally connected into the guide grooves, and the balls are arranged between the collars and the guide grooves, so as to realize rolling connection between the collars and the first and second driven shafts, greatly reduce the friction force and increase the adjusting precision.

Preferably, the interlayer film is made of a heat-conducting graphite film material. During work, the heat conducting effect of the interlayer film of the heat-conducting graphite film material is better. Compared with a common heat-conducting material, heat in the box body can be guided into the roll core of the roll-shaped diaphragm more rapidly, rapid uniform heating of the diaphragm is realized, and the quality of the diaphragm in the same roll is kept uniform and stable.

Preferably, heat-conducting holes are formed in each of the driving shaft, the first driven shaft and the second driven shaft in the front-back direction, and high-pressure hot steam is guided in the heat-conducting holes. During work, any heat-conducting material has loss of heat energy and needs a time period in the conduction process, and to further facilitate heating of the roll core of the diaphragm, the heat-conducting holes are formed in the driving shaft, the first driven shaft and the second driven shaft, high-pressure hot steam is guided in the heat-conducting holes, and thus, the interior of the diaphragm and the interlayer film can be heated rapidly, and the roll core is also heated rapidly.

Preferably, two temperature control openings are formed in the upper surface of the box body; a condenser is connected to the upper of the left temperature control opening through a pipeline, and the condenser is fixedly connected to the left side surface of the box body; an exhaust duct is fixedly connected to the upper portion of the right temperature control opening; and fan blades are rotatably connected to the interior of the exhaust duct. During work, according to the annealing requirement, the temperature in the box body needs to be slowly reduced and the interior of the box body is sealed, which is not beneficial to heat dissipation; and thus, the exhaust duct and the fan blades are arranged, so that the temperature in the box can be reduced as required by adjusting the rotating speed of the fan blades; meanwhile, by arranging the condenser, on one hand, a rapid cooling effect can be achieved, the requirements of rapid cooling products are met, and on the other hand, under the summer production condition when the temperature is high, it can be guaranteed that the temperature is reduced to a specified temperature range, and it is guaranteed that the annealing requirement is met.

Preferably, the outer arc face of the exhaust duct is in threaded connection with the sealing cover. When the heating plates are heated during work, the temperature control openings formed in the upper of the box body are open, rapid temperature rise and heat insulation in the box body are influenced; and thus, the sealing cover in threaded connection with the outer arc face of the exhaust duct is arranged to effectively seal the box body.

Preferably, an annular sealing groove is formed in the upper surface of the exhaust duct; a sealing ring is fixedly connected to the interior of the sealing groove; a heat-insulated cavity is formed in the sealing cover; and an aerogel felt is arranged in the heat-insulated cavity. During work, the annular sealing groove further ensures the sealing and heat insulation of the sealing cover; the annular sealing groove and the sealing ring therein ensure effective sealing of the sealing cover; and the aerogel felt ensures heat insulation at the position of the sealing cover and reduce loss of heat in the box body.

According to the present disclosure, the method for preparing the diaphragm of the lithium-ion battery by three layer co-extrusion has the advantages that:

1. the annealing box in the method is provided with the box body, the motor and the sealing cover; the heating plates which are uniformly arranged are fixedly connected to the internal surface of the box body, the driving shaft is horizontally arranged in the box body in the front-back direction, the first driven shaft is arranged in the left side of the driving shaft in the box body, the second driven shaft is arranged in the right side of the driving shaft in the box body, the interlayer film is in coiled connection to the position, inside the box body, between the driving shaft and the first driven shaft in the horizontal manner, and the diaphragm is in coiled connection to the position, inside the box body, between the driving shaft and the second driven shaft in the oblique manner; by means of the method and the annealing box in the method, the problems, in the prior, that the roll core of diaphragm of the roll-shaped structure tends to non-uniform heating and cooling of the diaphragm, the quality of the diaphragm is reduced or even the diaphragm is unqualified, purely cooling at the room temperature cannot meet the processing requirement for accurate temperature change within a period in the annealing process, great temperature change occurs in diaphragm processing in summer or winter, and external environment change greatly influences diaphragm production are solved; the annealing temperature is controllable, the external environment is isolated, influence of the external environment on the diaphragm is avoided, the heating uniformity of the diaphragm is ensured, and thus, the produced diaphragm is stable in quality, and large-scale rapid production is facilitated; and 2. the annealing box is provided with the exhaust duct, the sealing cover, and the condenser, two temperature control openings are formed in the upper surface of the box body, the condenser is communicated to the upper of the left temperature control opening through the pipeline, and is fixedly connected to the left side surface of the box body, the exhaust pipe is fixedly connected to the upper of the right temperature control box, the fan blades are rotationally connected into the exhaust duct, and the outer arc surfaces of the fan blades are in threaded connection with the sealing cover; by means of the exhaust duct and the fan blades, the rotating speed of the fan blades can be adjusted to realize heat radiation of the interior of the box body according to requirements; the condenser realizes rapid cooling and meets requirements of rapid cooling products on one hand, and ensures that the temperature is reduced to the specific temperature range and satisfy the anneal requirement when the temperature is relatively high during production in summer; and the outer surface of the exhaust duct is in threaded connection with the sealing cover, so that the sealing cover effectively seals the box body and ensures rapid temperature rise and heat insulation in the box body.

BRIEF DESCRIPTION OF DRAWINGS

These and other aspects of the present disclosure will be apparent from and elucidated with reference to the embodiments described hereinafter. In the following drawings:

FIG. 1 shows a flow diagram of a method for preparing a diaphragm of a lithium-ion battery by three layer co-extrusion;

Figure 2:
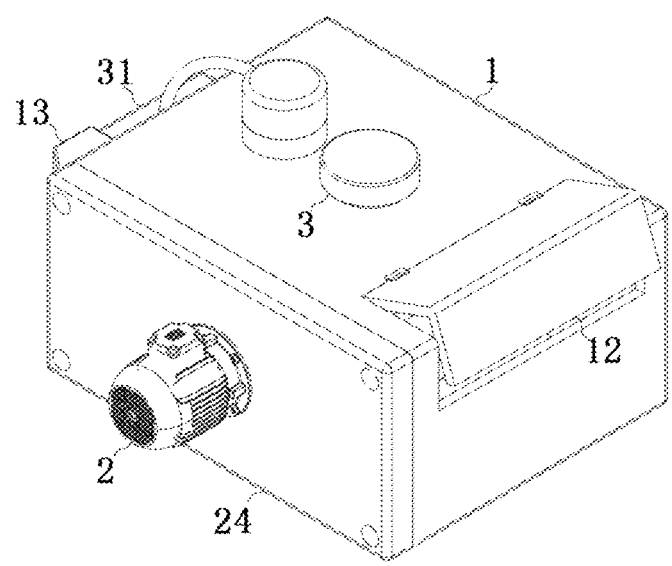
FIG. 2 shows an external view of an annealing box.

In the drawings: 1 box body, 11 heating plate, 12 sealing door, 13 control box, 2 motor, 21 driving shaft, 22 first driven shaft, 23 second driven shaft, 24 power box cover, 25 driving gear, 26 driven gear, 27 driving belt, 28 interlayer film, 29 diaphragm, 3 sealing cover, 31 condenser, 32 exhaust duct, 33 fan blades, 34 sealing ring, 35 aerogel felt, 36 collars, 37 adjusting plates, 38 springs, 39 balls.

DETAILED DESCRIPTION

In order to make the technical means, inventive features, objectives and effects of the present disclosure easy to be understood, the present disclosure will be further explained in detail with reference to the following embodiments.

Figure 3:
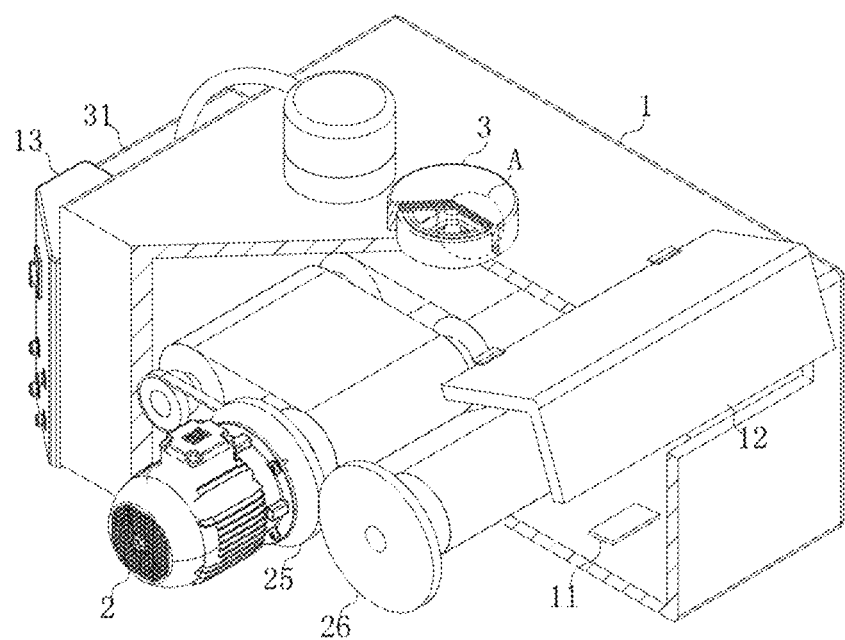
FIG. 3 shows a stereogram of the annealing box.
Figure 4:
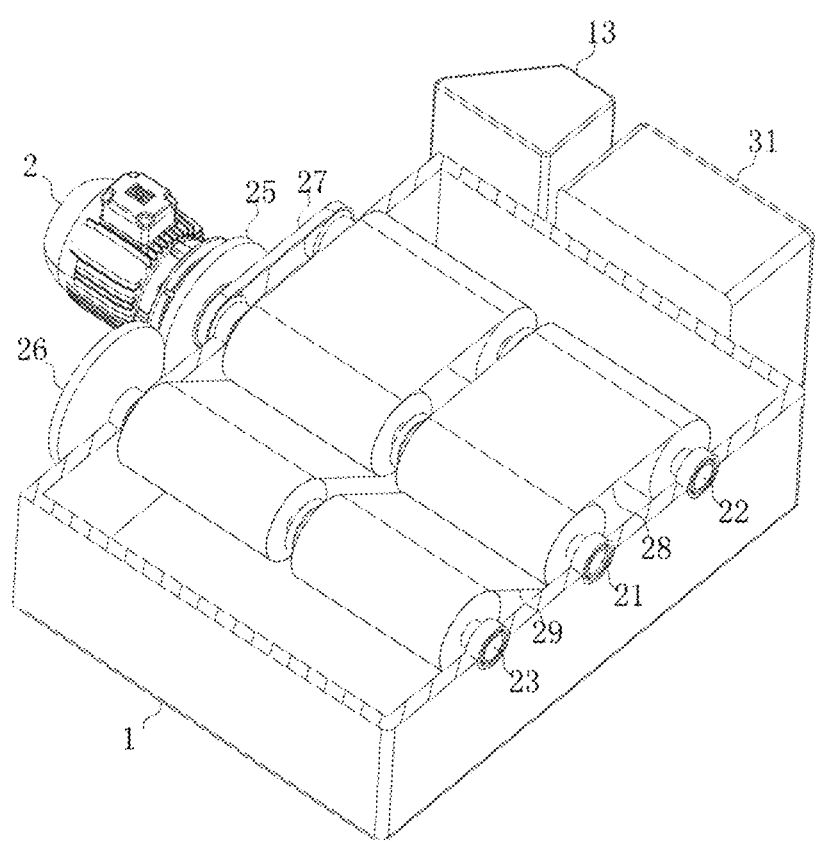
FIG. 4 shows a top view of the annealing box.
Figure 5:
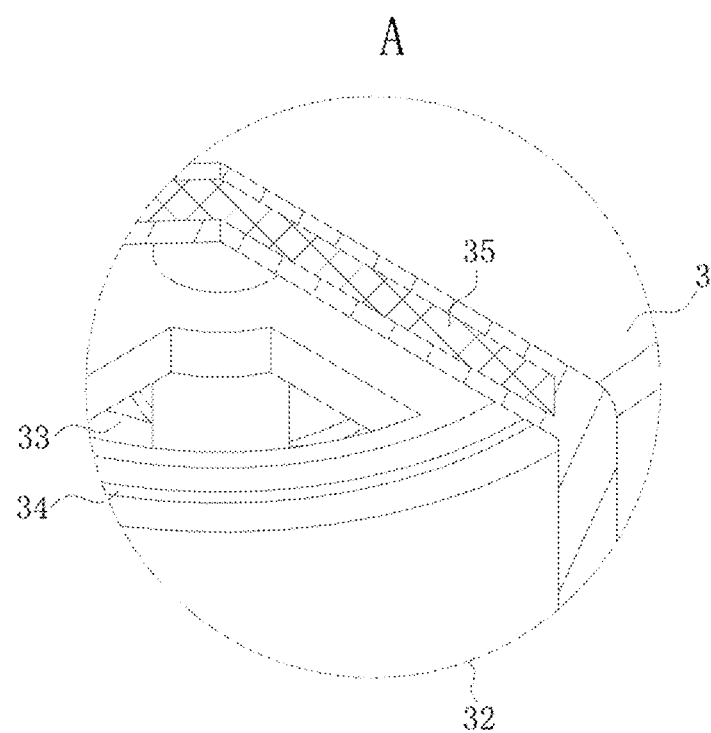
FIG. 5 shows a locally enlarged view at the position A of the FIG. 3.
Figure 6:
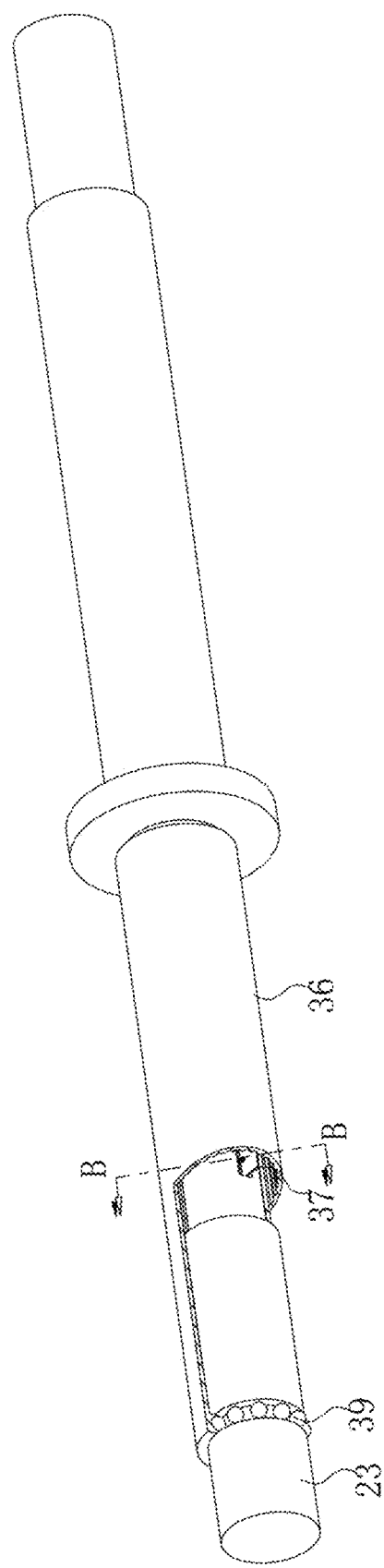
FIG. 6 shows a stereogram of a second driven shaft of the annealing box.
Figure 7:
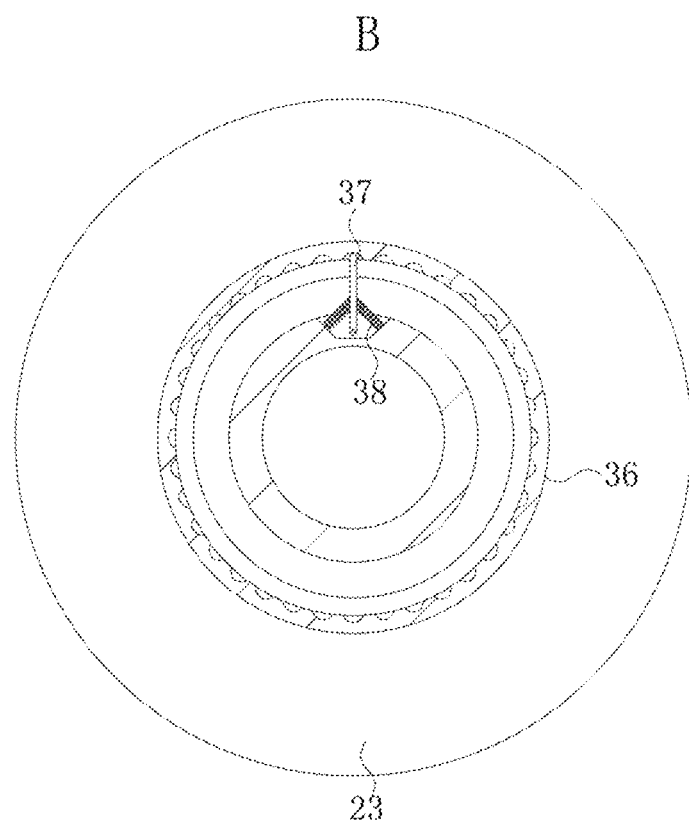
FIG. 7 shows a sectional view at the position B-B of the FIG. 6.

As shown in the FIG. 1 to FIG. 7, a method for preparing a diaphragm of a lithium-ion battery by three layer co-extrusion comprises the following steps:

S1, firstly, adding two different types of polypropylene resins into inlets of two different extruders respectively for melting and plasticizing at the conveying-section temperature of 60-70° C., the compression-section temperature of 150-200° C., the metering-section temperature of 200-230° C., and the rotating speed of 100-250 rpm;

S2, synchronously co-extruding the two different polypropylene resins obtained after melting and plasticizing in the step S1 from a three-layer composite casting die head of a three-layer co-extrusion casting machine, and drawing the co-extruded resins to form a film at a high draw ratio, so as to obtain a casting film with an A/B/A three-layer co-extrusion structure;

S3, placing the casting film with the A/B/A three-layer co-extrusion structure in an annealing box to be subjected to annealing at the annealing temperature of 130-150° C. for 1-24 h;

and S4, carrying out longitudinal cold and hot stretching on the annealed casting film to form a porous film structure, preparing the diaphragm 29 with a microporous structure and the A/B/A three-layer co-extrusion structure, and finally, thermoforming the obtained porous diaphragm and then cooling the diaphragm to room temperature;

wherein, the annealing box in S3 comprises a box body 1, a motor 2 and a sealing cover 3; the box body 1 is of a cuboid structure; a cavity is formed in the box body 1; the inner surface of the box body 1 is fixedly connected with heating plates 11 which are uniformly arranged; a driving shaft 21 is horizontally arranged in the box body 1 in the front-back direction; a first driven shaft 22 is arranged in the left side of the driving shaft 21 in the box body 1; a second driven shaft 23 is arranged in the right side of the driving shaft 21 in the box body 1; the driving shaft 21, the first driven shaft 22 and the second driven shaft 23 are rotationally connected with the box body 1 through bearings, and the front end surfaces of the first driven shaft 22 and the second driven shaft 23 penetrate through the box body 1 and extend out of the box body; the front end surface of the box body 1 is fixedly connected with a power box cover 24; the front end surface of the power box cover 24 is fixedly connected with the motor 2; an output shaft of the motor 2 penetrates through the power box cover 24, extends into the power box cover 24, and is fixedly connected with the front end surface of the driving shaft 21; a driving gear 25 is fixedly connected to the position, close to the flange face of the motor 2, of the outer arc face of the output shaft of the motor 2; the outer arc surface of the second driven shaft 23 is fixedly connected with a driven gear 26 in front of the box body 1, and the driving gear 25 is engaged with the driven gear 26; a driving rotary disc is fixedly connected to the position, close to the front end face of the box body 1, of the outer arc face of the output shaft of the motor 2; a driven rotary disc is fixedly connected to the position, close to the front end face of the first driven gear 26, of the outer arc face of the first driven shaft 22; a driving belt 27 is connected between the driving rotary disc and the driven rotary disc; an interlayer film 28 is in coiled connection to the position, in the box body 1, between the driving shaft 21 and the first driven shaft 22 in a horizontal manner; a diaphragm 29 is in coiled connection between the driving shaft 21 and the second driven shaft 23 in the box body 1 in an oblique manner; an opening is formed in the right upper edge of the box body 1; a sealing door 12 is arranged at the opening of the box body 1; and a control box 13 is fixedly connected to the position, close to the front end face of the box body 1, of the left side face of the box body 1. When the diaphragm 29 is annealed during work, the diaphragm 29 tends to be a roll-shaped structure to save space, however, the roll-shaped structure tends to causing non-uniform heating and cooling of the diaphragm 29, the quality of the diaphragm 29 is reduced or even the diaphragm is unqualified, purely cooling at the room temperature cannot meet the processing requirement for accurate temperature change within a period in the annealing process, great temperature change occurs in diaphragm processing in summer or winter, and external environment change greatly influences diaphragm production. The annealing box is thus adopted to reduce influence of environment change on diaphragm 29 product and ensure the stability of the diaphragm 29 quality. Concretely, the sealing door 12 is opened, the diaphragm 29 is coiled on the second driven shaft 23, the end of the diaphragm 29 is connected onto the driving shaft 21, and cooperated with the wound interlayer film 28 to realize synchronous coiling on the driving shaft 21; then, the sealing door 12 is closed, a power supply is switched on to heat the heating plates 11, and the temperature in the box body 1 is increased; the motor 2 is started, and the output shaft of the motor 2 rotates, so that on one hand, the driving shaft 21 is driven to rotate, and on the other hand, the driving rotary disc drives the driving belt 27 to move, further, the driven rotary disc is driven to rotate, and the first driven shaft 22 rotates in the same direction; meanwhile, the output shaft of the motor 2 rotates to drive the driving gear 25 to rotate, the driving gear 25 drives the driven gear 26 to rotate, and the driven gear 26 drives the second drive shaft 23 to rotate in the reverse direction; the diaphragm 29 and the interlayer film 28 are wound and separated synchronously; due to the fact that the heat conductivity of the interlayer film 28 is higher than that of the diaphragm 29, it is ensured that the diaphragm 29 is uniformly heated; and further, by means of forward and backward rotation of the motor 2, coiling between the driving shaft 21 and the second driven shaft 23 is realized, and rapid heating and uniform cooling of the diaphragm 29 is ensured. According to the method for preparing the diaphragm of the lithium-ion battery by three layer co-extrusion and the annealing box used therein, the problems in the prior art are overcome, the annealing temperature is controllable, external environment is isolated, influence of the external environment on the diaphragm 29 is avoided, heating uniformity of the diaphragm is guaranteed, the produced diaphragm 29 is stable in quality, and large-scale rapid production of the diaphragm is facilitated.

According to an embodiment, collars 36 are rotationally connected to the outer arc surfaces of the first driven shaft 22 and the second driven shaft 23; the diaphragm 29 and the interlayer film 28 are both wound on the outer arc surfaces of the corresponding collars; stepped grooves are formed in the positions, corresponding to the collars 36, of the outer arc surfaces of the first driven shaft 22 and the second driven shaft 23; an adjusting groove is formed in the groove bottom of each stepped groove; an adjusting plate 37 is arranged in each adjusting groove; and the side face of the side, opposite to the corresponding collar 36, of each adjusting plate 37 is of a rough surface structure. When the first driven shaft 22 and the second driven shaft 23 rotate during work, the interlayer film 28 and the diaphragm 29 are coiled, or the interlayer film 28 and the diaphragm 29 wound on the surfaces of the driven shafts are coiled to the surface of the driving shaft 21, so that the diaphragm 29 is coiled alternatively between the driving shaft 21 and the second driven shaft 23. However, during annealing, the diaphragm 29 is softened or contracted to certain extent due to high temperature in the box body 1, so that longitudinal cold and hot stretching of the casting film is needed subsequently. The collars 36 and the adjusting plates 37 are arranged to reduce influence of the annealing coiling process on the natural size of the diaphragm 29 or overcome the problem of tensile stress increase between the driving shaft 21 and the second driven shaft 23 when the diaphragm 29 is heated and contracted; when the diaphragm 29 is coiled on the surfaces of collars 36 and the diaphragm 29 is contracted to generate a tangential tensile force on the collars 36, the adjusting plates 37 are arranged between the second driven shaft 23 and the collars 36, and the side face of the side, opposite to the corresponding collar 36, of each adjusting plate 37 is of the rough surface structure; and when the tangential tensile force generated by contraction of the diaphragm 29 is greater than a friction force between the adjusting plate 37 and the corresponding collar 36, the collar 36 rotates relative to the first driven shaft 22 or second driven shaft 23, the tangential tensile stress generated by contraction of the diaphragm 29 is released, and the phenomenon that a too large contraction stress influences the diaphragm 29 quality is avoided.

According to an embodiment, the adjusting plates 37 are connected with the corresponding adjusting grooves in a hinged mode; springs 38 are connected between each adjusting plate 37 and the side faces of the two sides of the corresponding adjusting groove; a strip-shaped groove is formed at the position, of the adjusting plate 37, in the inner arc face of the collar 36, and the adjusting plate 37 is in contact connection with the strip-shaped groove; the small diameter of the collar 36 is greater than the outer diameter of the first driven shaft 22 and the outer diameter of the second driven shaft 23; guide grooves are formed in the positions, close to the two end faces of the corresponding collars 36, of the first driven shaft 22 and the second driven shaft 23 respectively; the position, corresponding to the guide groove, of each collars 36 is of a guide convex face structure; rolling grooves which are uniformly distributed are formed in the arc surfaces of the sides, opposite to the corresponding guide grooves, of the first driven shaft 22 and the second driven shaft 23; and balls 39 are connected into the rolling grooves in a rolling mode, and are connected with the groove bottoms of the corresponding guide grooves in a rolling mode. During work, the contraction stress of the diaphragm 29 is automatically released and adjusted by means of the friction force between the adjusting plates 37 and the collars 36. On one hand, the collars 36 and the rough surfaces of the adjusting plates 37 are worn much during long-term use, the friction coefficient is changed, relative rotation between the collars 36 and the first driven shaft 22 or second driven shaft 23 tends to occur in the normal coiling process of the diaphragm 29 and the interlayer film 28, and normal use of the annealing box is influenced. On the other hand, the collars 36 make direct contact with the first driven shaft 22 or second driven shaft 23, a relatively large contact surface generates a relatively large friction force, and normal adjustment of the adjusting plates 37 is greatly influenced. Therefore, the springs 38 and the balls 39 are arranged; the adjusting plates 37 are hinged and the springs 38 provide a pulling force, the adjusting plate 37 is positioned in one corresponding strip-shaped groove generally; when the tangential pull force of the diaphragm 29 or the interlayer film 28 on the collars 36 is relatively large, the adjusting plates 37 are rotated and the springs 38 are deformed; further, the adjusting plate 37 is moved to the adjacent strip-shaped groove when rotated too much; thus, relative rotational adjustment between the collars 36 and first driven shaft 22 or second driven shaft 23 is realized; and the guide grooves are arranged, the collars 36 are rotationally connected into the guide grooves, and the balls 39 are arranged between the collars 36 and the guide grooves, so as to realize rolling connection between the collars 36 and the first driven shaft 22 or second driven shaft 23, greatly reduce the friction force and increase the adjusting precision.

According to an embodiment, the interlayer film 28 is made of a heat-conducting graphite film material. During work, the heat conducting effect of the interlayer film 28 of the heat-conducting graphite film material is better. Compared with a common heat-conducting material, heat in the box body 1 can be guided into the roll core of the roll-shaped diaphragm 29 more rapidly, rapid uniform heating of the diaphragm 29 is realized, and the quality of the diaphragm in the same roll is kept uniform and stable.

According to an embodiment, heat-conducting holes are formed in each of the driving shaft 21, the first driven shaft 22 and the second driven shaft 23 in the front-back direction, and high-pressure hot steam is guided in the heat-conducting holes. During work, any heat-conducting material has loss of heat energy and needs a time period in the conduction process, and to further facilitate heating of the roll core of the diaphragm 29, the heat-conducting holes are formed in the driving shaft 21, the first driven shaft 22 and the second driven shaft 23, high-pressure hot steam is guided in the heat-conducting holes, and thus, the interior of the interlayer film 28 and the diaphragm 29 can be heated rapidly, and the roll core is also heated rapidly.

According to an embodiment, two temperature control openings are formed in the upper surface of the box body 1; a condenser 31 is connected to the upper of the left temperature control opening through a pipeline, and the condenser is fixedly connected to the left side surface of the box body 1; an exhaust duct 32 is fixedly connected to the upper portion of the right temperature control opening; and fan blades 33 are rotatably connected to the interior of the exhaust duct. During work, according to the annealing requirement, the temperature in the box body 1 needs to be slowly reduced and the interior of the box body 1 is sealed, which is not beneficial to heat dissipation; and thus, the exhaust duct 32 and the fan blades 33 are arranged, so that the temperature in the box can be reduced as required by adjusting the rotating speed of the fan blades 33; meanwhile, by arranging the condenser 31, on one hand, a rapid cooling effect can be achieved, the requirements of rapid cooling products are met, and on the other hand, under the summer production condition when the temperature is high, it can be guaranteed that the temperature is reduced to a specified temperature range, and it is guaranteed that the annealing requirement is met.

According to an embodiment, the outer arc face of the exhaust duct 32 is in threaded connection with the sealing cover 3. When the heating plates 11 are heated during work, the temperature control openings formed in the upper of the box body 1 are open, rapid temperature rise and heat insulation in the box body are influenced; and thus, the sealing cover 3 in threaded connection with the outer arc face of the exhaust duct 32 is arranged to effectively seal the box body 1.

According to an embodiment, an annular sealing groove is formed in the upper surface of the exhaust duct 32; a sealing ring 34 is fixedly connected to the interior of the sealing groove; a heat-insulated cavity is formed in the sealing cover 3; and an aerogel felt 35 is arranged in the heat-insulated cavity. During work, the annular sealing groove further ensures the sealing and heat insulation of the sealing cover 3; the annular sealing groove and the sealing ring 34 therein ensure effective sealing of the sealing cover 3; and the aerogel felt 35 ensures heat insulation at the position of the sealing cover 3 and reduce loss of heat in the box body 1.

The concrete work flow is as following:
during work, the sealing door 12 is opened, the diaphragm 29 is coiled on the second driven shaft 23, the end of the diaphragm 29 is connected onto the driving shaft 21, and cooperated with the wound interlayer film 28 to realize synchronous coiling on the driving shaft 21; then, the sealing door 12 is closed, a power supply is switched on to heat the heating plates 11, and the temperature in the box body 1 is increased; the motor 2 is started, and the output shaft of the motor 2 rotates, so that on one hand, the driving shaft 21 is driven to rotate, and on the other hand, the driving rotary disc drives the driving belt 27 to move, further, the driven rotary disc is driven to rotate, and the first driven shaft 22 rotates in the same direction; meanwhile, the output shaft of the motor 2 rotates to drive the driving gear 25 to rotate, the driving gear 25 drives the driven gear 26 to rotate, and the driven gear 26 drives the second drive shaft 23 to rotate in the reverse direction; the diaphragm 29 and the interlayer film 28 are wound and separated synchronously; due to the fact that the heat conductivity of the interlayer film 28 is higher than that of the diaphragm 29, it is ensured that the diaphragm 29 is uniformly heated; and further, by means of forward and backward rotation of the motor 2, coiling between the driving shaft 21 and the second driven shaft 23 is realized, and rapid heating and uniform cooling of the diaphragm 29 is ensured. The collars 36 and the adjusting plates 37 are arranged, when the diaphragm 29 is heated and contracted; when the diaphragm 29 is coiled on the surfaces of collars 36 and the diaphragm 29 is contracted to generate a tangential tensile force on the collars 36, the adjusting plates 37 are arranged between the second driven shaft 23 and the collars 36, and the side face of the side, opposite to the corresponding collar 36, of each adjusting plate 37 is of the rough surface structure; and when the tangential tensile force generated by contraction of the diaphragm 29 is greater than a friction force between the adjusting plate 37 and the corresponding collar 36, the collar 36 rotates relative to the first driven shaft 22 or second driven shaft 23, the tangential tensile stress generated by contraction of the diaphragm 29 is released. The springs 38 and the balls 39 are arranged; the adjusting plates 37 are hinged and the springs 38 provide a pulling force, the adjusting plate 37 is positioned in one corresponding strip-shaped groove generally; when the tangential pull force of the diaphragm 29 or the interlayer film 28 on the collars 36 is relatively large, the adjusting plates 37 are rotated and the springs 38 are deformed; further, the adjusting plate 37 is moved to the adjacent strip-shaped groove when rotated too much; thus, relative rotational adjustment between the collars 36 and first driven shaft 22 or second driven shaft 23 is realized; and the guide grooves are arranged, the collars 36 are rotationally connected into the guide grooves, and the balls 39 are arranged between the collars 36 and the guide grooves, so as to realize rolling connection between the collars 36 and the first driven shaft 22 or second driven shaft 23, greatly reduce the friction force and increase the adjusting precision. The interlayer film 28 is made of a heat-conducting graphite film material. The heat conducting effect of the interlayer film 28 of the heat-conducting graphite film material is better. Compared with a common heat-conducting material, heat in the box body 1 can be guided into the roll core of the roll-shaped diaphragm 29 more rapidly, rapid uniform heating of the diaphragm 29 is realized. The heat-conducting holes are formed in the driving shaft 21, the first driven shaft 22 and the second driven shaft 23, high-pressure hot steam is guided in the heat-conducting holes, and thus, the interior of the interlayer film 28 and the diaphragm 29 can be heated rapidly, and the roll core is also heated rapidly. The exhaust duct 32 and the fan blades 33 are arranged, so that the temperature in the box can be reduced as required by adjusting the rotating speed of the fan blades 33; meanwhile, by arranging the condenser 31, on one hand, a rapid cooling effect can be achieved, the requirements of rapid cooling products are met, and on the other hand, under the summer production condition when the temperature is high, it is guaranteed that that the temperature is reduced to a specified temperature range. The annular sealing groove is formed in the upper surface of the exhaust duct 32, the sealing ring 34 is fixedly connected to the interior of the sealing groove, and effective sealing of the sealing cover 3 is ensured; and the aerogel felt 35 ensures heat insulation at the position of the sealing cover 3 and reduce loss of heat in the box body 1.

Embodiment 1

Two rolls of diaphragms are taken and placed in the annealing box in the present disclosure, and then annealed at the annealing temperature of 145° C. for 24 hours according to requirements, the performance of the prepared two rolls of diaphragms is detected by sampling, an average value is obtained, a GB standard method is required, and instruments as a Suns tensile machine, a Gurley air permeability instrument and a solar S300 scanning electron microscope are adopted for performance detection.

Embodiment 2

Other two rolls of diaphragms in the same batch are placed into a common annealing device, and then annealed at the annealing temperature of 145° C. for 24 hours according to requirements, the performance of the prepared two rolls of diaphragms is detected by sampling, an average value is obtained, and also the GB standard method is required, and instruments as the Suns tensile machine, the Gurley air permeability instrument and the solar S300 scanning electron microscope are adopted for performance detection.

Embodiment 3

Other two rolls of diaphragms in the same batch are taken and not annealed, the performance of the prepared two rolls of diaphragms is detected by sampling, an average value is obtained, and also the GB standard method is required, and instruments as the Suns tensile machine, the Gurley air permeability instrument and the solar S300 scanning electron microscope are adopted for performance detection.

TABLE I

| Detection Data of Embodiments | Air Permeability (S/100 ml) | Porosity (%) | Shrinkage Rate (%) 90° C./2 h | Shrinkage Rate (%) 105° C./1 h | Breaking Elongation (%) | Longitudinal Tensile Strength (Mpa) | Puncture Strength (gf) |
|---|---|---|---|---|---|---|---|
| 1 | 405 | 37.8 | 0.3 | 1.05 | 220 | 165 | 530 |
| 2 | 345 | 38.3 | 1.25 | 2.2 | 143 | 137 | 340 |
| 3 | 320 | 40.5 | 2.5 | 3.3 | 95 | 115 | 210 |

According to the table 1, the prepared three-layer co-extruded diaphragm of the lithium ion battery has high tensile property. When the annealing box is used for annealing, the performance of the obtained diaphragm is greatly improved compared with that from the common annealing device, particularly, the tensile strength can reach 150 Mpa or above, and the requirements of a large number of users can be met; the puncture strength reaches 500 gf or above, so that the puncture phenomenon occurring when the battery is assembled can be effectively avoided; the thermal shrinkage rate is far lower than that of a diaphragm product obtained by traditional annealing, so that the diaphragm does not have the phenomenon of short circuit due to large shrinkage in use; the air permeability and the porosity are also in a proper range; the performance of the lithium ion battery can be better met, and compared with the performance of the diaphragm obtained without annealing treatment, each performance of the product without annealing is far lower than that after annealing treatment, so that the annealing box provided by the present disclosure has great popularization and application values in the aspect of production of the three-layer co-extruded lithium ion battery diaphragm from the aspect of overall performance parameters.

While the present disclosure has been illustrated and described in detail in the foregoing description and drawings, such illustration and description are to be considered illustrative or exemplary and not restrictive; the present disclosure is not limited to the disclosed embodiments. Other variations and improvements to the disclosed embodiments can be understood and effected by those skilled in the art in practicing the claimed invention, from a study of the drawings, the disclosure, and the appended claims.

The invention claimed is:

1. A method for preparing a diaphragm of a lithium-ion battery by three layer co-extrusion, the method comprising:
  adding two different types of polypropylene resins into inlets of two different extruders respectively for melting and plasticizing at a conveying-section temperature of 60-70° C., a compression-section temperature of 150-200° C., a metering-section temperature of 200-230° C., and a rotating speed of 100-250 rpm;
  synchronously co-extruding the two different types of polypropylene resins obtained after melting and plasticizing from a three-layer composite casting die head of a three-layer co-extrusion casting machine, and
  drawing the polypropylene resins co-extruded to form a casting film with an A/B/A three-layer co-extrusion structure;
  placing the casting film with the A/B/A three-layer co-extrusion structure in an annealing box to be subjected to annealing at an annealing temperature of 130-150° C. for 1-24 hours; and
  carrying out a first longitudinal stretching and a second longitudinal stretching on the casting film annealed, wherein a stretching temperature of the second longitudinal stretching is higher than a stretching temperature of the first longitudinal stretching, thereby forming a porous film structure,
  preparing the diaphragm with a microporous structure and the A/B/A three-layer co-extrusion structure, and
  finally, thermoforming the diaphragm and then cooling the diaphragm to a room temperature;
  wherein, the annealing box comprises a box body, a motor and a sealing cover;
  wherein the box body is of a cuboid structure and provided with a cavity; and an inner surface of the box body is fixedly connected with heating plates which are uniformly arranged;
  wherein a driving shaft is horizontally arranged in the box body in a front-back direction, a first driven shaft is arranged in a left side of the driving shaft in the box body, and a second driven shaft is arranged in a right side of the driving shaft in the box body;
  wherein the driving shaft, the first driven shaft and the second driven shaft are rotationally connected with the box body through bearings, and front end surfaces of the first driven shaft and the second driven shaft penetrate through the box body and extend out of the box body;
  wherein a front end surface of the box body is fixedly connected with a power box cover, and a front end surface of the power box cover is fixedly connected with the motor;

wherein an output shaft of the motor penetrates through the power box cover, extends into the power box cover, and the output shaft is fixedly connected with a front end surface of the driving shaft;

wherein a driving gear is fixedly connected to an outer arc face of the output shaft of the motor, and the driving gear is arranged between a flange face of the motor and the front end surface of the box body;

wherein an outer arc surface of the second driven shaft is fixedly connected with a driven gear in front of the box body, and the driving gear is engaged with the driven gear;

wherein a driving rotary disc is fixedly connected to an outer arc face of the output shaft of the motor, and the driving rotary disc is arranged between the driving gear and the front end surface of the box body;

wherein a driven rotary disc is fixedly connected to an outer arc face of the first driven shaft in front of the box body;

wherein a driving belt is connected between the driving rotary disc and the driven rotary disc;

wherein an interlayer film is in coiled connection between the driving shaft and the first driven shaft in the box body in a horizontal manner;

wherein the diaphragm is in coiled connection between the driving shaft and the second driven shaft in the box body in an oblique manner;

wherein an opening is formed in a right upper edge of the box body, and a sealing door is arranged at the opening of the box body; and wherein a control box is fixedly connected to a left side face of the box body.

2. The method according to claim 1, wherein the interlayer film is made of a heat-conducting graphite film material.

3. The method according claim 1, wherein an outer arc face of an exhaust duct is in threaded connection with the sealing cover.

4. The method according to claim 1, wherein heat-conducting holes are formed in each of the driving shaft, the first driven shaft and the second driven shaft in the front-back direction, and a steam is guided in the heat-conducting holes.

5. The method according to claim 1, wherein an annular sealing groove is formed in a upper surface of an exhaust duct;
a sealing ring is fixedly connected to an interior of the sealing groove; a heat-insulated cavity is formed in the sealing cover; and
an aerogel felt is arranged in the heat-insulated cavity.

6. The method according to claim 1, wherein two temperature control openings are formed in an upper surface of the box body;
a condenser, is connected to an upper of a left temperature control opening through a pipeline, and the condenser is fixedly connected tote left side surface of the box body;
an exhaust duct is fixedly connected to an upper portion of a right temperature control opening; and
fan blades are rotatably connected an interior of the exhaust duct.

7. The method according to claim 1, wherein collars are rotationally connected to outer arc surfaces of the first driven shaft and the second driven shaft;
the diaphragm and the interlayer film are both wound on outer arc surfaces of the corresponding collars;
stepped grooves are formed in positions, corresponding to the collars, of the outer arc surfaces of the first driven shaft and the second driven shaft;
an adjusting groove is formed in a groove bottom of each stepped groove;
an adjusting plate is arranged in each adjusting groove; and
a side face of a side, opposite to the corresponding collar, of each adjusting plate is of a rough surface structure.

8. The method according to claim 1, wherein adjusting pates are connected with corresponding adjusting grooves in a hinged mode;
springs are connected between each adjusting plate and side faces of two sides of the corresponding adjusting groove;
a strip-shaped groove is formed at a position, of the adjusting plate, in an inner arc face of a collar, and the adjusting plate is in contact connection with the strip-shaped groove;
an inner diameter of the collar is greater than an outer diameter of the first driven shaft and an outer diameter of the second driven shaft;
guide grooves are formed in the first driven shaft and the second driven shaft respectively at positions corresponding to two end faces of the collars;
the position, corresponding to the guide groove, of each collars is of a guide convex face structure;
rolling grooves which are uniformly distributed are formed in arc surfaces of sides, opposite to the corresponding guide grooves, of the first driven shaft and the second driven shaft;
and balls are connected into the rolling grooves in a rolling mode, and are connected with groove bottoms of the corresponding guide grooves in a rolling mode.

* * * * *